United States Patent Office 2,903,334
Patented Sept. 8, 1959

2,903,334

PREPARATION OF URANIUM TRIOXIDE

John S. Buckingham, Richland, Wash., assignor to the United States of America as represented by the United States Atomic Energy Commission No Drawing. Application August 22, 1955
Serial No. 529,968

2 Claims. (Cl. 23—14.5)

This process deals with the production of uranium trioxide, and in particular with the production of uranium trioxide from aqueous solutions of uranyl nitrate.

Uranium trioxide has a great many uses. One of the most important applications is as the starting material for the production of uranium tetrafluoride; for this purpose uranium trioxide is reduced with hydrogen to uranium dioxide and the dioxide is then hydrofluorinated with hydrogen fluoride. The uranium trioxide is frequently obtained by concentrating and calcining aqueous uranyl nitrate solutions, a process well known in the art.

Certain problems are encountered in the process of producing uranium tetrafluoride from uranium trioxide. For instance, the uranium dioxide obtained as described above reacts rather slowly and incompletely with the hydrogen fluoride so that the final product still contains considerable quantities of unreacted uranium dioxide and a poor yield is obtained, a most undesirable feature.

It is an object of this invention to provide a process for producing, from uranyl nitrate solutions, uranium trioxide which, when reduced with hydrogen, yields uranium dioxide that is more easily hydrofluorinated and thus yields a purer product and a higher efficiency than the process described above. (Since this process deals exclusively with the preparation of uranium trioxide, the increase of reactivity will be expressed hereinafter as that of uranium trioxide although any reactivity increase is actually encountered in the uranium dioxide produced from the uranium trioxide of this invention.)

It is another object of this invention to provide a process for the production of uranium trioxide from uranyl nitrate solutions which yields a product of increased density.

It is also an object of this invention to provide a process for the production of uranium trioxide from aqueous uranyl nitrate solutions which yields a more granular product than the processes used heretofore so that it can be removed from the denitration pot or other vessel used for denitration more easily.

These objects are accomplished by adding a sulfur or a sulfur-containing compound to the uranyl nitrate solution prior to the denitration procedure comprising concentration and calcination steps. The uranium trioxide obtained by this furnishes a uranium dioxide, when reduced with hydrogen, which shows a considerably higher reactivity with hydrogen fluoride than a product prepared without the sulfur-containing additive or "sulfating agent," as it will be referred to hereinafter. The chemism bringing about the favorable effect of the sulfating agent is not known with certainty.

The sulfating agent has to be added to the aqueous nitrate solution. In one instance sulfuric acid was added to dry uranium trioxide, and the mixture was then heated at 340° C. The product obtained thereby contained 1000 p.p.m. of sulfate anion. No increase of reactivity could be established.

A great many sulfating agents have been found suitable. Sulfur, ammonium sulfate, sulfuric acid, thiourea, sulfamic acid, and hydroxylamine hydrogen sulfate have given excellent results. The use of sulfuric acid does not increase the corrosion problems during denitration as might have been expected.

The quantity of the sulfating agent is best kept below 0.5% by weight of the uranyl nitrate hexahydrate. A quantity of between 0.1 and 0.5% was found to increase the reactivity by about 50%.

In the following an example is given of the novel process for the purpose of illustrating the invention.

*Example*

A quantity of 8 grams of uranyl nitrate hexahydrate which contained 0.2% by weight of sulfuric acid in the form of $UO_2SO_4.3H_2O$ was heated in a steel beaker on a hot plate which had a surface temperature of 350° C. The uranyl nitrate was completely denitrated in 12 minutes and yellow uranium trioxide was formed. This uranium trioxide was reduced with hydrogen to uranium dioxide, and the latter was then hydrofluorinated to uranium tetrafluoride. A yield of 100% $UF_4$ was obtained.

In the following table a number of additional experiments are summarized to illustrate the efficiency of the invention. The conversion ratio represents a comparison of the quantity of uranium tetrafluoride obtained from a uranium trioxide to which a sulfating agent had been added to the quantity of uranium tetrafluoride formed under identical conditions but using a uranium trioxide prepared without the sulfating agent. Experiments 1 through 13 were carried out each with 25 ml. of a uranyl nitrate solution, while experiments 14 and 15 were plant scale tests; these two runs were carried out in stainless steel denitration pots.

| Run No. | Sulfating Agent [1] | Percent $UF_4$ | Conversion Ratio |
|---|---|---|---|
| 1 | None | 65.46 | 0.98 |
| 2 | 0.10% sulfamic acid | 79.05 | 1.17 |
| 3 | 0.25% sulfamic acid | 92.53 | 1.38 |
| 4 | 0.50% sulfamic acid | 100.3 | 1.47 |
| 5 | 1.0% sulfamic acid | 96.74 | 1.41 |
| 6 | 0.073% sulfuric acid | 90.34 | 1.31 |
| 7 | 0.18% sulfuric acid | 97.98 | 1.42 |
| 8 | 0.73% sulfuric acid | 96.99 | 1.38 |
| 9 | 1.46% sulfuric acid | 100.3 | 1.43 |
| 10 | 4.36% sulfuric acid | 99.43 | 1.45 |
| 11 | 0.50% ammonium sulfate | 96.29 | 1.37 |
| 12 | 0.50% $(NH_2)_2$ CS | | 1.43 |
| 13 | 0.25% S | | 1.37 |
| 14 | None | 70.71 | 1.03 |
| 15 | 0.075% sulfamic acid | 94.01 | 1.41 |

[1] Weight percent based on uranyl nitrate hexahydrate.

It is obvious from the table that all additives increased the reactivity considerably.

In another set of experiments the densities of uranium trioxides produced without and with a sulfating agent were compared. While normally, without a sulfating agent, uranium trioxide had a density between 2.6 and 3.0, the "sulfated" uranium trioxide had a density of 3.69.

It will be understood that this invention is not to be limited to the details given herein but that it may be modified within the scope of the appended claims.

What is claimed is:

1. A process of producing uranium trioxide from an aqueous uranyl nitrate solution comprising adding sulfur-containing material selected from the group consisting of sulfur, thiourea, sulfamic acid, sulfuric acid, ammonium sulfate, and hydroxylamine hydrogen sulfate to said aqueous solution, evaporating the solution to dryness, and calcining the dry residue to form uranium trioxide.

2. The process of claim 1 wherein the sulfur-containing material is added in a quantity between 0.1 and 0.5% by weight of the uranyl nitrate hexahydrate.

No references cited.